US012789216B2

(12) United States Patent
Kaya

(10) Patent No.: US 12,789,216 B2
(45) Date of Patent: Nov. 10, 2026

(54) POWDER COATING GUN WITH A MOTORIZED AND MULTI-ANGLE NOZZLE

(71) Applicant: Str Teknik Makina Insaat Turizm Tekstil Sanayi Ve Ticaret Limited Sirketi, Arnavutköy (TR)

(72) Inventor: Yalçin Kaya, Arnavutköy (TR)

(73) Assignee: Str Teknik Makina Insaat Turizm Tekstil Sanayi Ve Ticaret Limited Sirketi, Arnavutköy (TR)

( * ) Notice: Subject to any disclaimer, the term of this patent is extended or adjusted under 35 U.S.C. 154(b) by 175 days.

(21) Appl. No.: 18/848,751

(22) PCT Filed: Oct. 6, 2023

(86) PCT No.: PCT/TR2023/051088

§ 371 (c)(1),
(2) Date: Sep. 19, 2024

(87) PCT Pub. No.: WO2025/071511

PCT Pub. Date: Apr. 3, 2025

(65) Prior Publication Data

US 2026/0175250 A1 Jun. 25, 2026

(30) Foreign Application Priority Data

Sep. 26, 2023 (TR) ............................... 2023/012021

(51) Int. Cl.

| | |
|---|---|
| ***B05B 15/652*** | (2018.01) |
| ***B05B 5/03*** | (2006.01) |
| ***B05B 5/053*** | (2006.01) |

(52) U.S. Cl.

CPC ............ *B05B 15/652* (2018.02); *B05B 5/032* (2013.01); *B05B 5/0533* (2013.01)

(58) Field of Classification Search

CPC ..... B05B 15/652; B05B 5/032; B05B 5/0533; B05B 5/1683; B05B 5/043; B05B 12/14; B05B 14/48; B05B 7/14

See application file for complete search history.

(56) References Cited

FOREIGN PATENT DOCUMENTS

| | | | |
|---|---|---|---|
| CN | 107930947 | A | 4/2018 |
| CN | 109365187 | A | 2/2019 |
| EP | 0227368 | A2 | 7/1987 |

OTHER PUBLICATIONS

Kaya, Y., PCT/TR2023/051088, Written Opinion, Sep. 12, 2024, 3 pages.
Kaya, Y., PCT/TR2023/051088, International Search Report, Sep. 12, 2024, 3 pages.
Kaya, Y., Turkish Patent Application No. 2023/012021, Research Report, Apr. 15, 2024, 8 pages.

*Primary Examiner* — Christopher R Dandridge
(74) *Attorney, Agent, or Firm* — Rahman LLC

(57) ABSTRACT

The present invention relates to a powder coating gun with a motorized and multi-angle nozzle for use in electrostatic powder coating guns, enamel coating guns, powder coating and enamel coating booths.

3 Claims, 2 Drawing Sheets

POWDER COATING GUN WITH A MOTORIZED AND MULTI-ANGLE NOZZLE

TECHNICAL FIELD

Figure 1:
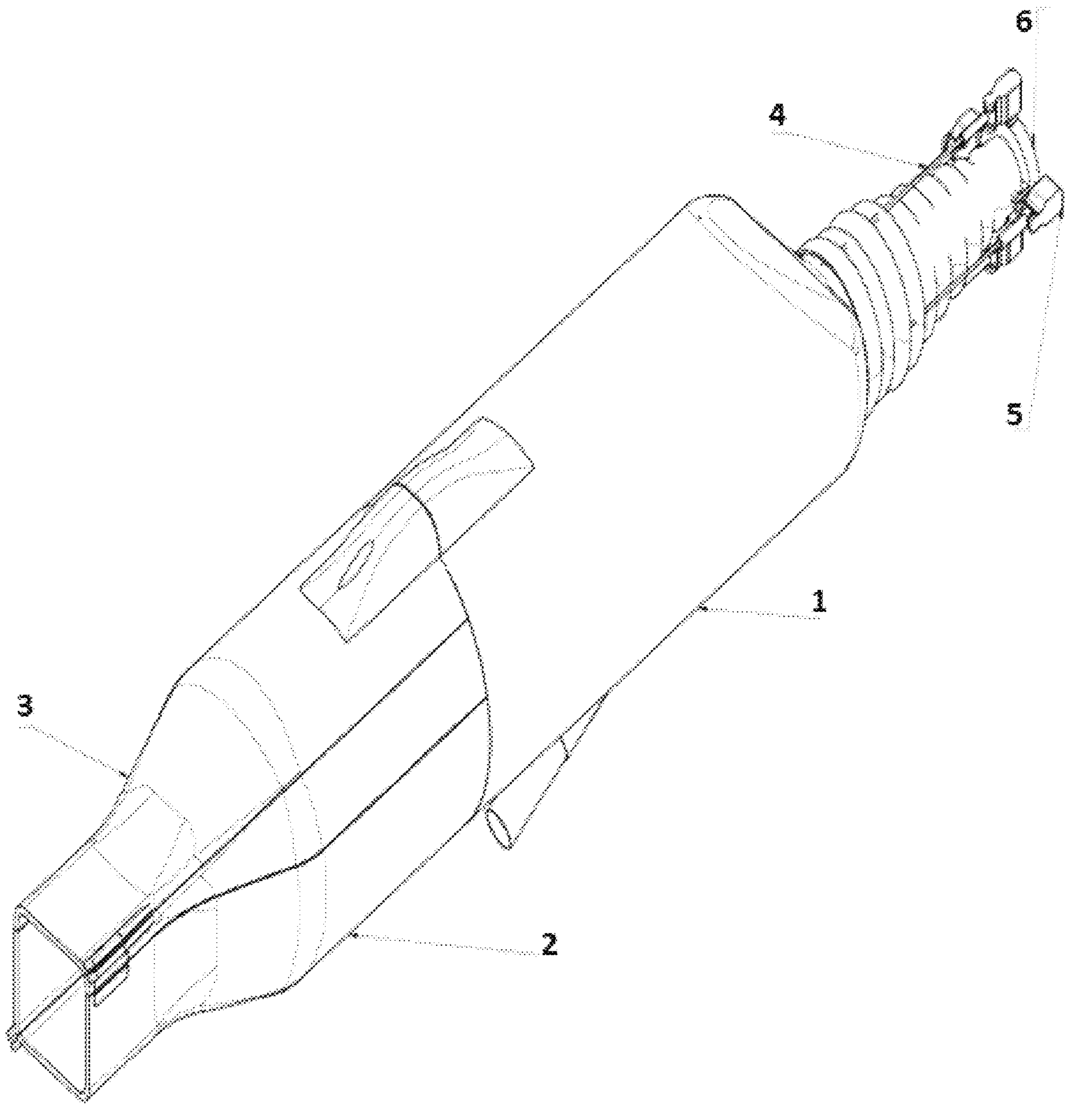

The invention relates to a powder coating gun with a motorized and multi-angle nozzle for use in electrostatic powder coating guns, enamel coating guns, powder coating and enamel coating booths.

BACKGROUND ART

In the state of the art, multiple guns are utilized to carry out the coating process in booths. The nozzles on the spouts of the coating guns are fixed at 45-degree and 60-degree angles, and the coating process is performed by using as many guns as required depending on the size of the product. In the state of the art, several technical problems can still not be avoided, because as the number of guns increases, so does the amount of paint sprayed, resulting in a nonhomogeneous coating and the accumulation of powder paint on products with challenging geometry. At least 5 guns are used in the state of the art.

In conclusion, the abovementioned shortcomings and the inadequacy of the current practice entail an improvement in the respective technical field. Thus, there is a need for an invention to overcome the described problems.

DESCRIPTION OF THE INVENTION

Developed for eliminating the aforementioned disadvantages and providing new advantages to the respective technical field, the present invention relates to a powder coating gun with a motorized and multi-angle nozzle for use in electrostatic powder coating guns, enamel coating guns, powder coating and enamel coating booths.

Thanks to the invention, fewer guns are used because the angle of the nozzle can be adjusted. The surface of the product to be coated is therefore smoother since the paint is not spread homogeneously when there are too many guns. The paint does not accumulate on the surface because it is evenly distributed thanks to the invention. When there are too many guns, there is accumulation on the middle portion of the product to be coated and the corners cannot be coated properly, this problem is solved with this invention.

With the movement of the parts driven by the servo motor, it performs the rotational movement by applying force to the hinges at the end.

Two types of paint are used in paint booths: powder paint and enamel paint. Since these types of paints are in powder form, they adhere electrostatically to the surface to be painted. Then the baking process follows. However, if the product has not been painted homogeneously, deformations occur. It also varies depending on the geometry of the painted material. Therefore, reducing the number of guns and applying the paint homogeneously with a rotating nozzle provides a great advantage to the user in terms of homogeneous painting of the product and the use of fewer guns. Since the number of guns in the booth will be reduced, the shortage of space in the booth will no longer be a problem and the product will be coated more homogeneously thanks to the use of a single gun.

In an alternative embodiment of the invention, other types of motors may be employed instead of servo motors. The use of a different motor instead of a servo motor is within the scope of the invention protection.

The powder coating gun with motorized and multi-angle nozzle of the present disclosure can be manufactured bigger, smaller, and in different sizes and dimensions.

DRAWINGS

The applications of the present invention that is briefly summarized above and addressed in detail below can be understood by referring to the sample applications depicted in the attached drawings of the invention. However, it must be stated that the attached drawings show only the typical applications of this invention and that since the invention allows other equally effective applications, its scope cannot be assumed to be limited.

FIG. 1: It is a perspective and general view of the present invention.

Figure 2:
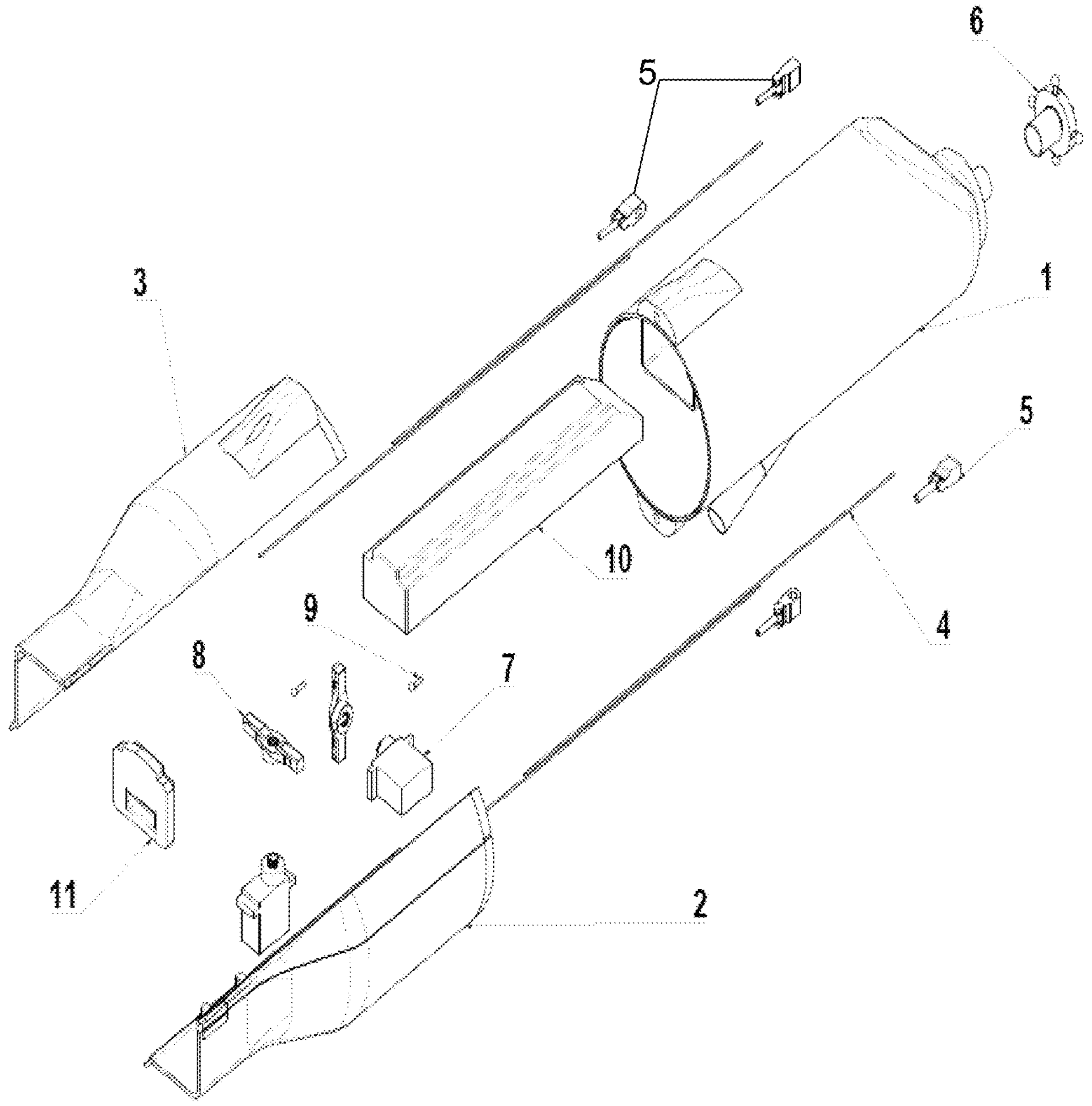

FIG. 2: It is an exploded view of the present invention.

In order to facilitate understanding, identical reference numbers are used to indicate identical elements in the figures, where possible. The shapes are not drawn to scale and can be simplified for clarity. It is believed that the elements and features of an application can be usefully incorporated into other applications without further explanation.

EXPLANATION OF DETAILS IN THE DRAWINGS

Explanations of reference numbers shown in the drawings are given below.

1. Front shell
2. Lower rear shell
3. Upper rear shell
4. Carbon rod
5. Antistatic hinge
6. Deflector
7. Servo motor
8. Servo hinges
9. Carbon rod holder
10. Cascade
11. Cascade holder

DETAILED EXPLANATION OF THE INVENTION

The preferred embodiments of the powder coating gun with motorized and multi-angle nozzle according to the present disclosure, which are mentioned in this detailed description, are only intended for providing a better understanding of the subject-matter, and should not be construed in any restrictive sense.

The invention is the powder coating gun with a motorized and multi-angle nozzle which comprises a front shell (1), lower rear shell (2), upper rear shell (3), and as seen in FIG. 1 and FIG. 2, it comprises a carbon rod (4), antistatic hinge (5), deflector (6), servo motor (7), servo hinges (8), carbon rod holder (9), cascade (10), cascade holder (11).

The front shell (1) not only provides a clear design and form to the gun but also houses the cascade (10) and the pipe through which the paint will pass. The lower rear shell (2) provides a clear design and form, and it is also the part containing the mounting slots of the servo motors (7). The upper rear shell (3) provides a clear design and form, and it also ensures the protection of servo motors (7) from dust.

The carbon rod (4) is made of carbon fiber. The carbon rod (4) rests between servo motors (7) and hinges, it drives the hinge by moving back and forth, causing its end part to rotate. It is antistatic, i.e. it remains unaffected by electrostatic discharge.

The rotational movement of the servo motors (7) is transmitted to the carbon rod (4) so that the antistatic hinge (5) moves. Thus, the surface to be painted is exposed to the paint at an angle as much as it turns towards it. It is extremely important that they are antistatic, hence the use of antistatic plastic hinges. If they are not antistatic, they can be affected by electrostatic discharge and cause lightning, so they must definitely be antistatic.

When the powder coating that passes through the pipe comes to the deflector (6), the powder coating is charged with energy with the voltage from the cascade (10). It is different from other deflectors (6) in that it is movable. It becomes movable by being attached to the antistatic hinges (5). Since they are attached freely, as the hinges move with the help of the carbon rod, so does the deflector.

The servo motors (7), at least two of which will be used, are employed in this invention to help it rotate right, left, up, down, and then 360 degrees. The servo motors (7) provide motion to the carbon rods at an angle of 0-60 degrees, and the carbon rods enable rotational movement by driving the hinges on the nozzle. The angles of rotation are between 0 and 60 degrees.

The servo hinges (8) transmit the drive from the servo motor (7) to the carbon rods (4). When the servo motor (7) moves the servo hinges (8), the carbon rods move as much as the strength of the drive since the hinges are connected to the carbon rods.

The carbon rod holder (9) ensures that the carbon rods are fitted to the servo hinges (8) without being deformed. If they are assembled without the carbon rod holder (9), the carbon rods will break as they are thin. The carbon rods, which are resistant to push and pull, are assembled with holders because they are not resistant to pressure. The carbon rod holder (9) is made of hard plastic material and thus protects the mounting portions of the carbon rods.

The cascade (10) charges the deflector (6) with static electricity. It takes its energy from the electrical panels and charges approximately 100 volts. With the help of the coils and resistors therein, it transfers about 100 volts of static electricity to the deflector.

The cascade holder (11) prevents the cascade (10) from moving. Since lightning may occur if the cascade (10) moves, it keeps the cascade (10) fixed. The cascade (10) may move due to the motion in automatic or manual guns used in robots. Any movement will cause lightning. To prevent this, the cascade holder (11) is mounted to the front shell (1) with the help of screws.

All parts are initially disassembled. The cascade (10) is placed in its chamber located in the front shell (1), and similarly, the carbon rod holders (9) are attached to the carbon rods (4). Then these carbon rods (4) are attached to the servo hinges (8). Servo motors (7) are placed in the relevant mounting areas on the lower rear shell (2) and then they are fixed there with screws. Once the servo motors (7) are assembled, the servo hinges (8) are attached to the gears of the motors. The drive from the servo motor (7) is thus transmitted to the carbon rods (4). Carbon rods (4) are placed in their reference places on the front shell (1). After the cascade holder (11) is also fitted to its reference position on the front shell (1), the upper rear shell (3) is attached to the rear lower shell (2) in order to prevent the internal components from being exposed to dust. These parts, which become a single structure upon being assembled, are then joined to the front shell (1) so that the invention's external form is ready and the internal components are operational. The assembly of the components in the movable nozzle starts with antistatic hinges (5). After the antistatic hinges (5) are attached to the carbon rods, they are fixed to the deflector (6), and the assembly of the movable part is thus completed. Thereafter, the servo motors (7) are powered to give motion to them. After the servo motors (7) start moving, they drive the servo hinges (8). The activated servo hinges (8) steer the carbon rods. Then the carbon rods drive the antistatic hinges (5) to make them get an angle. Since the deflector (6) is also attached to the hinges, it takes the position of the angle. The coating process is initiated after it is adjusted according to the angle at which the product is wished to be painted. The servo motors (7) are powered by the panels in the cabin system and thus transmit the energy to create motion. This energy directed to the hinges moves the carbon rods, creates pressure back and forth, and causes the carbon rods to move back and forth. The carbon rods transmit the same back-and-forth motion to the antistatic hinges (5) and since the antistatic hinges (5) are freely attached to the deflector (6), the deflector (6) moves at an angle between 0 and 60 degrees.

What is claimed is:

1. A powder coating gun with a motorized and multi-angle nozzle comprising a front shell, a lower rear shell, an upper rear shell and is developed for use in electrostatic powder coating guns, enamel coating guns, powder coating and enamel coating booths, and wherein the powder coating gun comprises:

an antistatic carbon rod made of carbon fiber which rests between at least two servo motors and an antistatic hinge, and causes an end part of the antistatic hinge to rotate by driving it the antistatic hinge by way of moving back and forth;

the antistatic hinge being made of plastic which moves upon being driven by the carbon rod following the transmission of rotational movement of the servo motors to the carbon rod and is attached to a deflector;

the deflector which becomes movable by being attached to the antistatic hinge and enables coating by moving at an angle between 0 and 60 degrees;

the at least two servo motors providing motion to the carbon rod and providing the rotational movement by creating a main drive of the powder coating gun;

servo hinges which enable transmission of the drive from the servo motors to the carbon rod and are attached to gears of the servo motors; and a carbon rod holder which allows for the fixing of the carbon rod to the servo hinges without being deformed and is attached to the carbon rod.

2. The powder coating gun with a motorized and multi-angle nozzle according to claim 1, further comprising a cascade which enables charging of the deflector with static electricity using coils and resistors therein.

3. The powder coating gun with a motorized and multi-angle nozzle according to claim 2, further comprising a cascade holder which enables preventing the cascade from moving and is mounted to the front shell using screws.

* * * * *